United States Patent
Suganuma

(10) Patent No.: US 7,573,836 B2
(45) Date of Patent: Aug. 11, 2009

(54) SWITCH SYSTEM AND LOOP TRANSFER METHOD

(75) Inventor: Shigeru Suganuma, Tokyo (JP)

(73) Assignee: NEC Corporation, Tokyo (JP)

( * ) Notice: Subject to any disclaimer, the term of this patent is extended or adjusted under 35 U.S.C. 154(b) by 503 days.

(21) Appl. No.: 11/374,979

(22) Filed: Mar. 15, 2006

(65) Prior Publication Data

US 2006/0209879 A1    Sep. 21, 2006

(30) Foreign Application Priority Data

Mar. 17, 2005    (JP) .............................. 2005-077180

(51) Int. Cl.
*H04L 12/28* (2006.01)
(52) U.S. Cl. ...................... 370/258; 370/401
(58) Field of Classification Search ................. 370/460, 370/461, 412, 227
See application file for complete search history.

(56) References Cited

U.S. PATENT DOCUMENTS 5,235,595 A * 8/1993 O'Dowd ..................... 370/392
7,385,918 B2 * 6/2008 Takagi ........................ 370/222

FOREIGN PATENT DOCUMENTS

| JP | 04-281640 | 7/1992 |
| JP | 04-329045 | 11/1992 |
| JP | 10-326242 | 8/1998 |
| JP | 10-285198 | 10/1998 |
| JP | 2000-261498 | 9/2000 |
| JP | 2002-141922 | 5/2002 |
| JP | 2003-18172 | 1/2003 |

* cited by examiner

*Primary Examiner*—Hassan Kizou
*Assistant Examiner*—Camquyen Thai
(74) *Attorney, Agent, or Firm*—Whitham Curtis Christofferson & Cook, PC

(57) ABSTRACT

In a switch system including a plurality of switch mechanisms that form a ring topology, each of the switch mechanisms includes an input and output unit that inputs and outputs a packet to and from an outside of a loop; and a gate unit that transmits transmission information including whether there is a packet to be received by one of the switch mechanisms set as a following stage in the loop to the following stage in the loop at predetermined time's intervals. The input and output unit accumulates the packet input from the outside of the loop, and generate transmission information on the accumulated packet. The gate unit transmits the packet accumulated in the input and output unit and the transmission information on the accumulated packet to the following stage in the loop when receiving transmission information, from one of the switch mechanisms set as a preceding stage in the loop, indicating that there is not a packet to receive.

13 Claims, 8 Drawing Sheets

DATA POSITION "01": NULL (NO DATA)
"01": START (TOP OF DATA)
"02"⎫
⎬ CONTINUE (CONTINUOUS DATA)
"FE"⎭

"FF": END (END OF DATA)

SWITCH SYSTEM AND LOOP TRANSFER METHOD

BACKGROUND OF THE INVENTION

1. Field of the Invention

The present invention relates to a switch system used in switching among a plurality of information processing apparatuses for holding data communications. More specifically, the present invention relates to a switch system that employs a loop architecture based on a ring topology.

2. Description of the Related Art

Conventionally, there is known an arrangement of a switch system for controlling data flow in a communication network so as to efficiently process a large amount of data using network apparatuses connected to the communication network. The switch system includes a plurality of input and output terminals for transmitting and receiving data to and from a plurality of network apparatuses. Types of the switch system are classified according to differences in connection form of the input and output terminals. Connection forms of the input and output terminals can be classified into a plurality of forms, i.e., network topologies. Namely, they are classified into a star (tree) topology, a bus (branch) topology, and a ring (loop) topology.

The star topology is an arrangement in which all nodes are connected to one node called "hub". Examples of a switch system of this type include a crossbar switch in which input and output terminals connected to respective nodes are mutually connected. The bus topology is an arrangement in which a plurality of nodes are connected to a common bus in parallel, and an arbiter that controls occupation of the common bus is added to the bus topology. A star switch and a bus switch that adopt these respective topologies differ in internal structure but can employ protocols of the same format or physical cables of the same type for external network apparatuses.

The ring topology is an arrangement in which a plurality of nodes are connected to one another to form a loop as shown in FIG. 6. FIG. 7 is a block diagram of an internal structure of a ring switch that adopts the ring topology. Each input and output terminal of the ring switch has a pair of connection lines for inputting and outputting data to and from a network apparatus connected to the terminal. The input and output terminals confirm whether or not the respective nodes are present, and a loop is formed by connection between the terminals and external nodes if the nodes are present, and the loop is closed by short-circuiting signal lines if the nodes are not present.

Further, the same protocol is used in the loop. However, in consideration of possible use of a different protocol outside the loop, for example, a switch system can adopt a configuration as shown in FIG. 8. FIG. 8 shows the switch system that enables connection to network apparatuses using a non-ring type protocol by interposing a protocol converter between each input and output terminal and each network apparatus.

Examples of a physical layer protocol applied to the ring switch include a fiber channel-arbitrated loop ("FC-AL") protocol. The FC-AL protocol is one obtained by expanding a fiber channel ("FC"), which is a serial interface standard, to the ring topology. By executing an arbitration operation among nodes on the loop, a node that is to transmit data to the loop is determined. In this arbitration operation, the data is transmitted and received upon completion of preparations by a transmission end and a reception end.

Examples of a conventional switch system using the FC-AL protocol include a switch system disclosed in, for example, Japanese Patent Application Laid-Open (JP-A) No. 2000-261498. JP-A No. 2000-261498 discloses a method for appropriately setting an arbitrated loop physical address (AL_PA) used for the FC-AL to hardware.

The conventional technique has, however, the following disadvantages. If the FC-AL protocol is applied to the switch system, only one packet (which is referred to as "frame" under the FC-AL protocol) can be transmitted into the loop. Due to this, if the FC-AL protocol is used, then a communication band is used inefficiently, and it is difficult to improve multiplexing of data communication.

Furthermore, if the FC-AL protocol is used, it is necessary to travel a signal for the arbitration operation around the loop. Namely, unless time corresponding to one round of the loop passes, no nodes can be used. As a result, a delay of a half round of the loop is generated on average. Thus, it is difficult for the ring switch using the FC-AL protocol to establish high-speed communication, as compared with the star switch in the topology in which the respective nodes are connected to one another.

SUMMARY OF THE INVENTION

The present invention has been achieved to solve the conventional disadvantages. It is an object of the present invention to provide a switch system capable of making effective use of a communication band allocated to a loop.

A switch system according to the present invention comprises a plurality of switch mechanisms that form a ring topology, wherein each of the switch mechanisms includes an input and output unit that inputs and outputs a packet to and from an outside of a loop; and a gate unit that transmits transmission information including whether there is a packet to be received by one of the switch mechanisms set as a following stage in the loop to the following stage in the loop at predetermined time's intervals, wherein the input and output unit accumulates the packet input from the outside of the loop, and generate transmission information on the accumulated packet, and wherein the gate unit transmits the packet accumulated in the input and output unit and the transmission information on the accumulated packet to the following stage in the loop when receiving transmission information, from one of the switch mechanisms set as a preceding stage in the loop, indicating that there is not a packet to receive.

DESCRIPTION OF THE PREFERRED EMBODIMENTS

Figure 1:
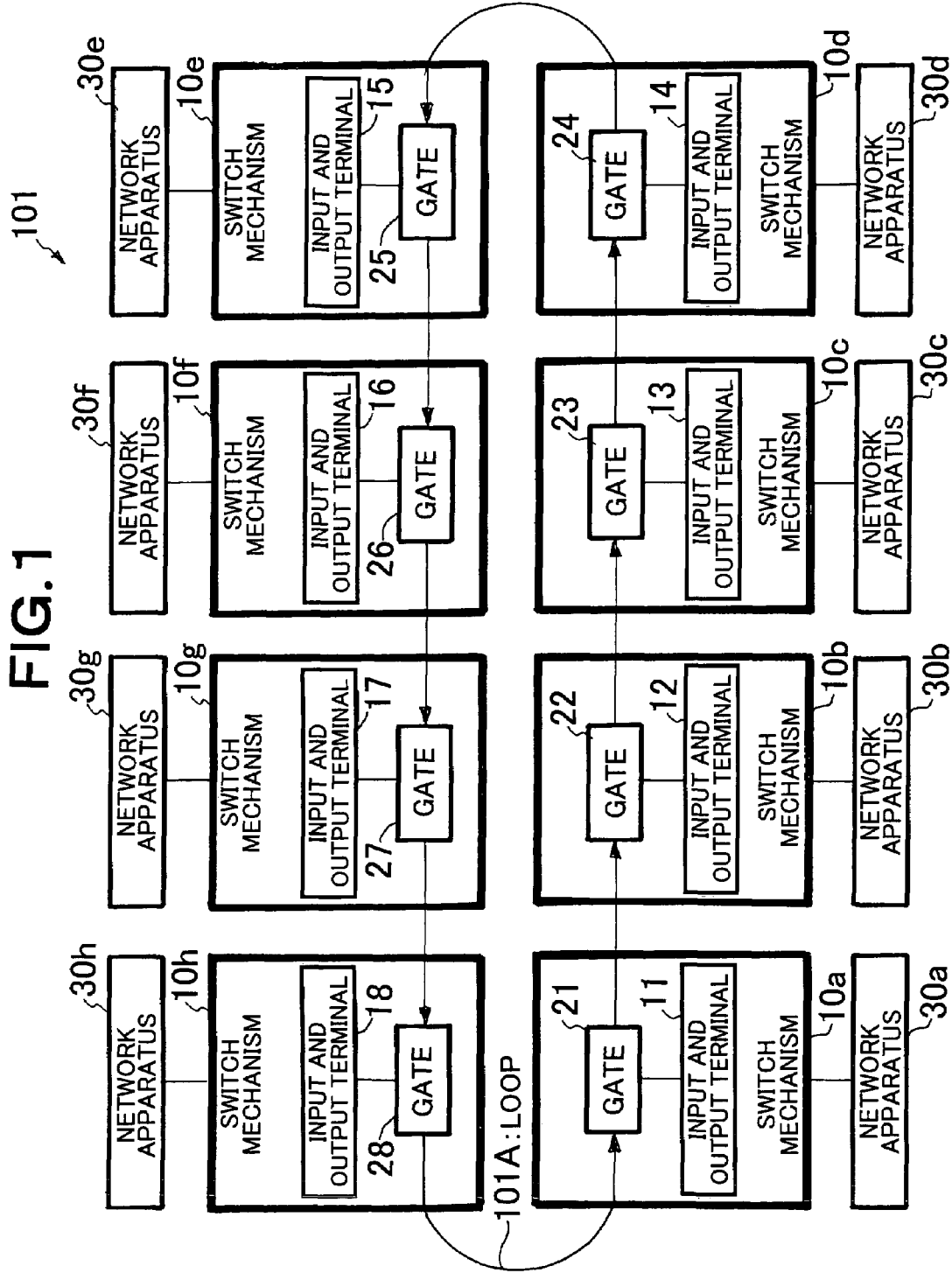
FIG. 1 is a block diagram of a configuration of a switch system according to one embodiment of the present invention.

Embodiments of the present invention will be described hereinafter in detail with reference to the drawings. FIG. 1 is a block diagram of a configuration of a switch system according to one embodiment of the present invention. The switch system 101 according to this embodiment includes a plurality of switch mechanisms 10a to 10h in the ring topology, and forms a loop 101A for transmitting a signal in an arrow direction shown in FIG. 1. The switch mechanisms 10a to 10h are connected to network apparatuses 30a to 30h, respectively, which are present outside the loop 101A.

Figure 6:
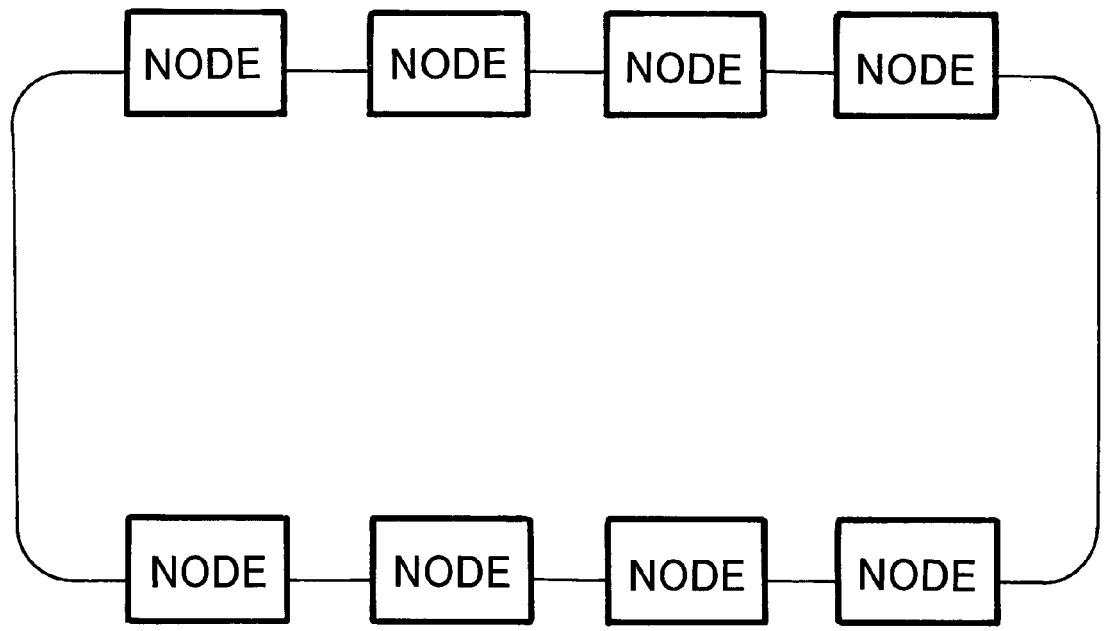
FIG. 6 is an explanatory view of a ring topology.
Figure 7:
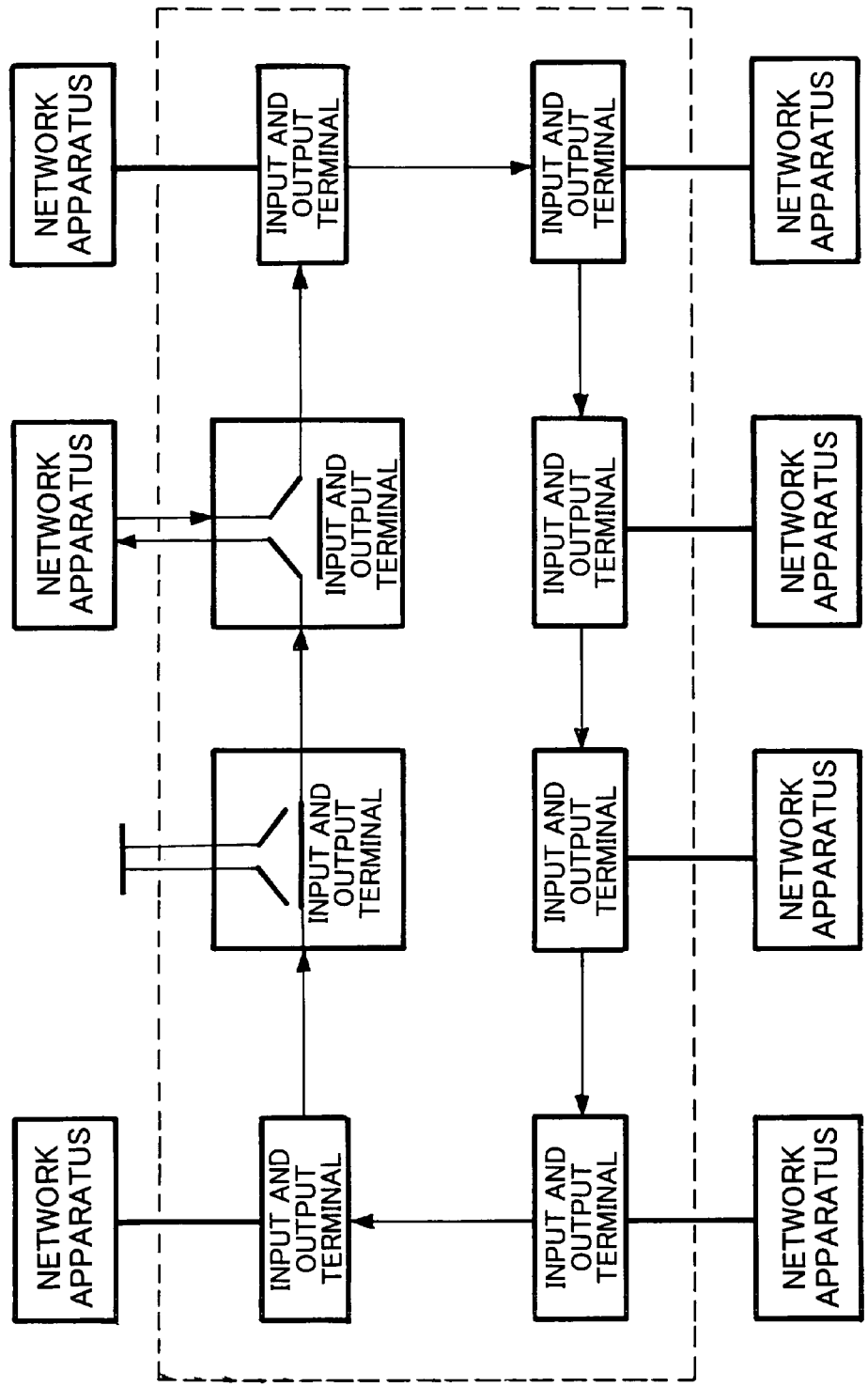
FIG. 7 is a block diagram of a conventional ring switch system.
Figure 8:
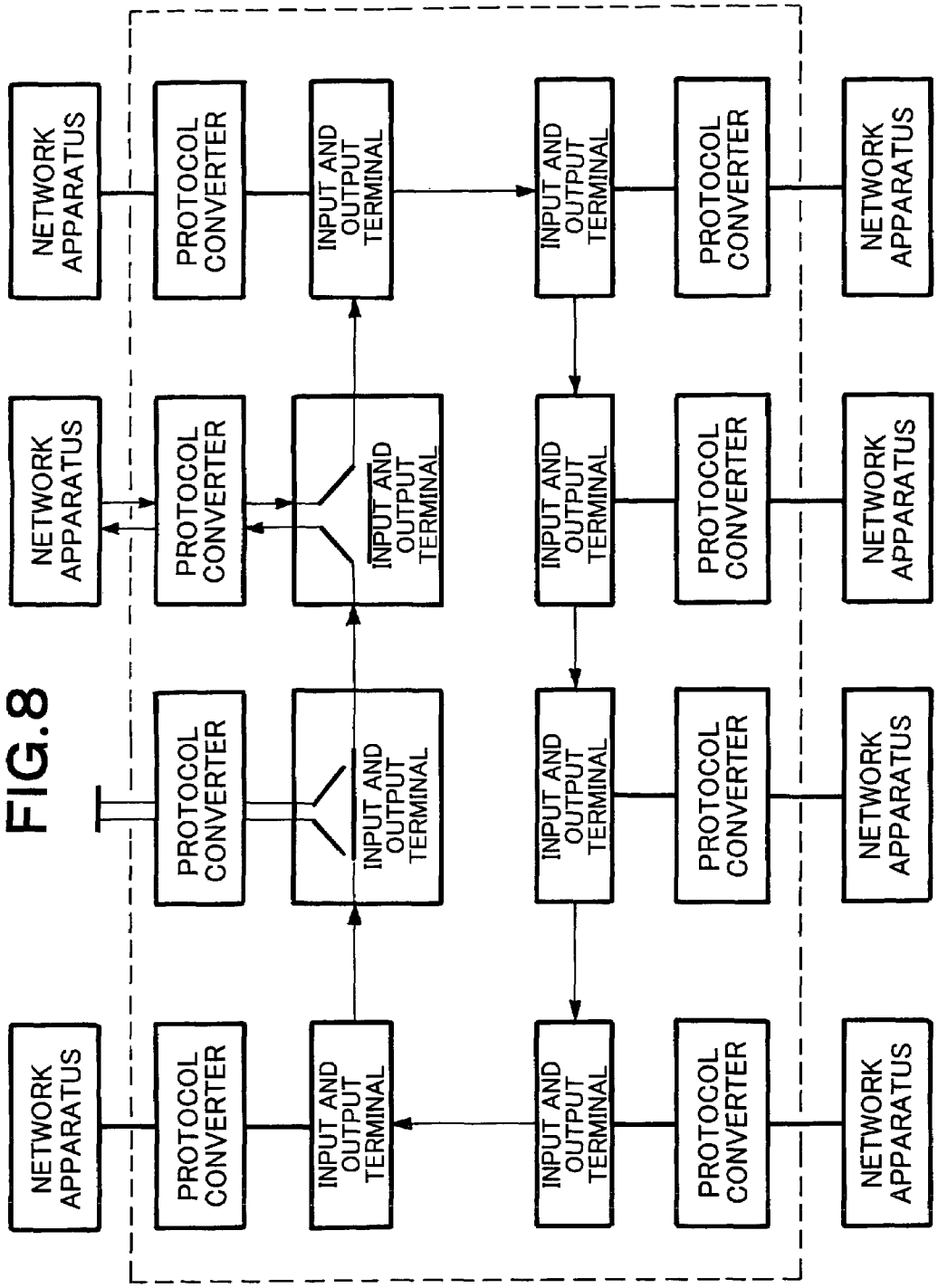
FIG. 8 is a block diagram of a conventional ring switch system.

The respective switch mechanisms (10a to 10h) correspond to nodes in a network topology-related configuration shown in FIG. 6 and are equal in configuration. For instance, the switch mechanism 10a includes an input and output terminal 11 for inputting and outputting packets to and from a network apparatus 30a outside the loop 101A, and a gate 21 for transmitting a carrier signal, to be described later, to a following stage of the switch mechanism 10a in the loop 101A at predetermined time intervals. The following stage in the loop 101A refers to a switch mechanism (10a to 10h) that is to receive a signal transmitted from a switch mechanism of the viewpoint. A preceding stage in the loop 101A refers to a switch mechanism (10a to 10h) that is to transmit a signal to a switch mechanism of the viewpoint. For instance, from a view of the switch mechanism 10a, the following stage thereof is the switch mechanism 10b, and the preceding stage thereof is the switch mechanism 10h.

Figure 2:
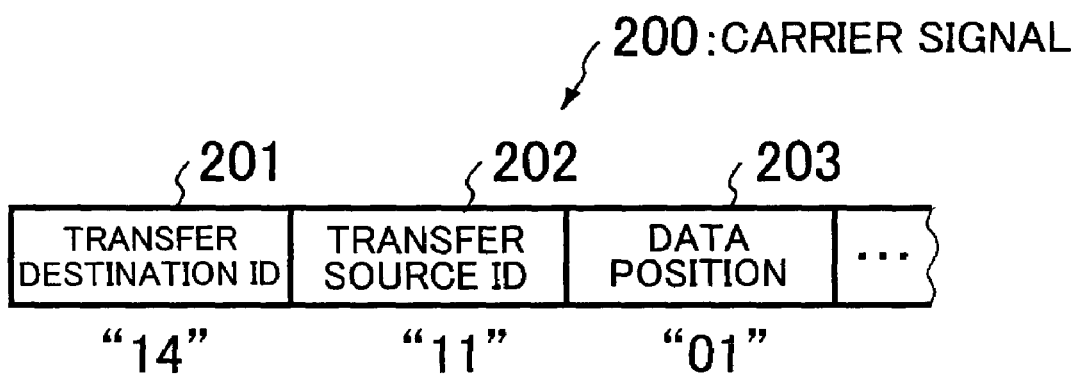
FIG. 2 is an explanatory view of a carrier signal according to the embodiment of the present invention.

FIG. 2 is a block diagram of a configuration of the carrier signal transmitted from the gate 21. The carrier signal 200 corresponds to transmission information according to the present invention. Information including whether or not packet data, which the switch mechanism 10b set as the following stage in the loop 101A is to receive, is present is described in the carrier signal 200. The carrier signal 200 is a signal having a predetermined data amount. As shown in FIG. 2, a transfer destination ID 201 that indicates a destination of a target packet, a transfer source ID 202 that indicates a transmission source of the packet, a data position 203 that indicates a relative position of divided packet data, and the like are described in the carrier signal 200. Packet data and carrier check codes may be additionally described in the carrier signal 200 if it is necessary to do so.

In an area of the data position 203, one of "00 (NULL)" indicating that the target packet is not present, "01 (START)" indicating top data of the packet, "02~FE (CONTINUE)" indicating data sequentially continuous to the top data, and "FF (END)" indicating end data of the packet is described. Therefore, if the packet data to be transferred to the following stage in the loop 101A is not present, "00" is set to the data position 203. If the packet data to be transferred thereto is present, one of "01" to "FF" is set to the data position 203. In the example shown in FIG. 2, 254 patterns from "01" to "FE" are prepared on assumption that the data position 203 is represented by eight bits. However, the present invention is not limited to this example and the number of bits representing the data position 203 may be appropriately changed.

For instance, if an ID of the input terminal 11 of the switch mechanism 10a is "11" and an ID of an input and output terminal 14 of the switch mechanism 10d is "14", the carrier signal 200 shown in FIG. 2 suggests that the packet data is the top data of a packet which the switch mechanism 10a receives from the network apparatus 30a through the input and output terminal 11, and that the packet data is top data of the packet transferred from the switch mechanism 10a in the loop 101A and then output from the input and output terminal 14 of the switch mechanism 10d.

Gates 21 to 28 of the respective switch mechanisms (10a to 10h) simultaneously transmit the carrier signal to their following stages in the loop 101A at unit time's intervals.

Figure 3:
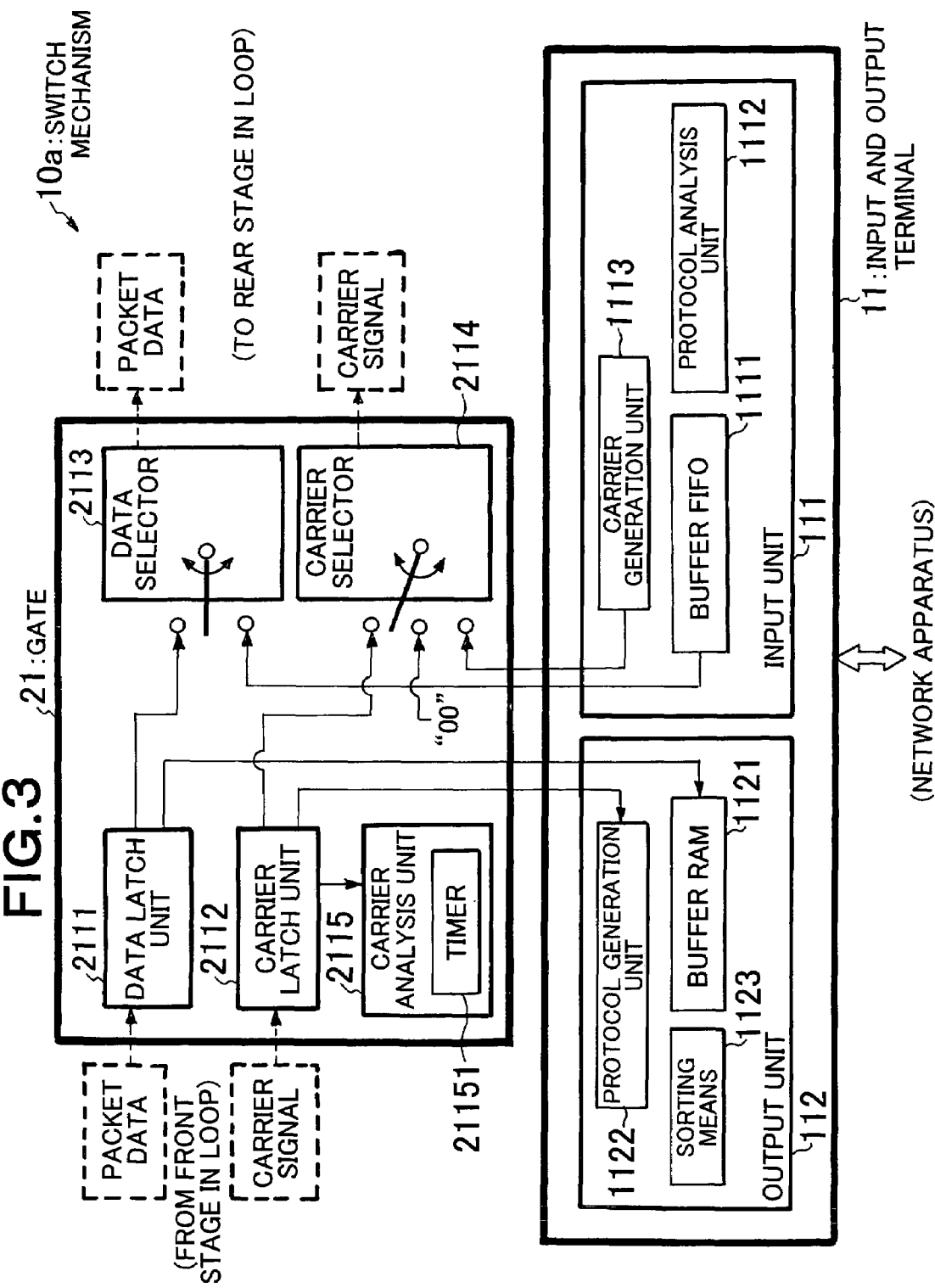
FIG. 3 is a block diagram of an internal configuration of a switch mechanism according to the embodiment of the present invention.

FIG. 3 is a block diagram of an internal configuration of the switch mechanism 10a. It is noted that the other switch mechanisms 10b to 10h are equal in internal configuration to the switch mechanism 10a. As shown in FIG. 3, the input and output terminal 11 includes an input unit 111 and an output unit 112.

A buffer first-in first-out (FIFO) 1111 of the input unit 111 accumulates packets input from the network apparatus 30a. A protocol analysis unit 1112 determines data transmission and reception destinations and the like from header information on each of the packets accumulated in the buffer FIFO 1111, and supplies necessary information for the carrier signal to a carrier generation unit 1113. The carrier generation unit 1113 generates the carrier signal described above with reference to FIG. 2 based on the information which the carrier generation unit 1113 receives from the protocol analysis unit 1112.

A buffer random-access memory (RAM) 1121 of the output unit 112 stores packet data transferred from the preceding stage of the switch mechanism 10a in the loop 101A. A protocol generation unit 1112 prepares necessary information for the packet data stored in the buffer RAM 1121 to generate the packet data as packets to be output to the network apparatus 30a. This information is extracted from the carrier signal received, together with the packet data, from the preceding stage of the switch mechanism 10a. Sorting means 1123 arranges the packets to be output to the network apparatus 30a in data order.

The gate 21 includes a data latch unit 2111, a carrier latch unit 2112, a carrier analysis unit 2115, a data selector 2113, and a carrier selector 2114. The data latch unit 2111 and the carrier latch unit 2112 latch the packet data and the carrier signal from the preceding stage of the network mechanism 30a in the loop 101A, respectively. The carrier analysis unit 2115 analyzes a setting content of the latched carrier signal. The data selector 2113 and the carrier selector 2114 select the packet data and the carrier signal to be transmitted to the following stage of the switch mechanism 30a in the loop 101A, respectively.

The data selector 2113 selects one of the packet data latched by the data latch unit 2111 and the packet data accumulated in the buffer FIFO 1111, and transmits the selected packet data to the following stage in the loop 101A in response to an indication from the carrier analysis unit 2115. The carrier selector 2114 selects one of the carrier signal latched by the carrier latch unit 2112, the carrier signal generated by the carrier generation unit 1113, and the carrier signal indicating "NULL data" with "00" set to the data position 203, and transmits the selected carrier signal to the following stage in the loop 101A in response to an indication from the carrier analysis unit 2115.

The carrier analysis unit 2115 activates a timer 21151 in situations to be described later so as to control the packet data accumulated in the buffer FIFO 1111 not to be transmitted to the following stage for a predetermined period before time-out.

Figure 4:
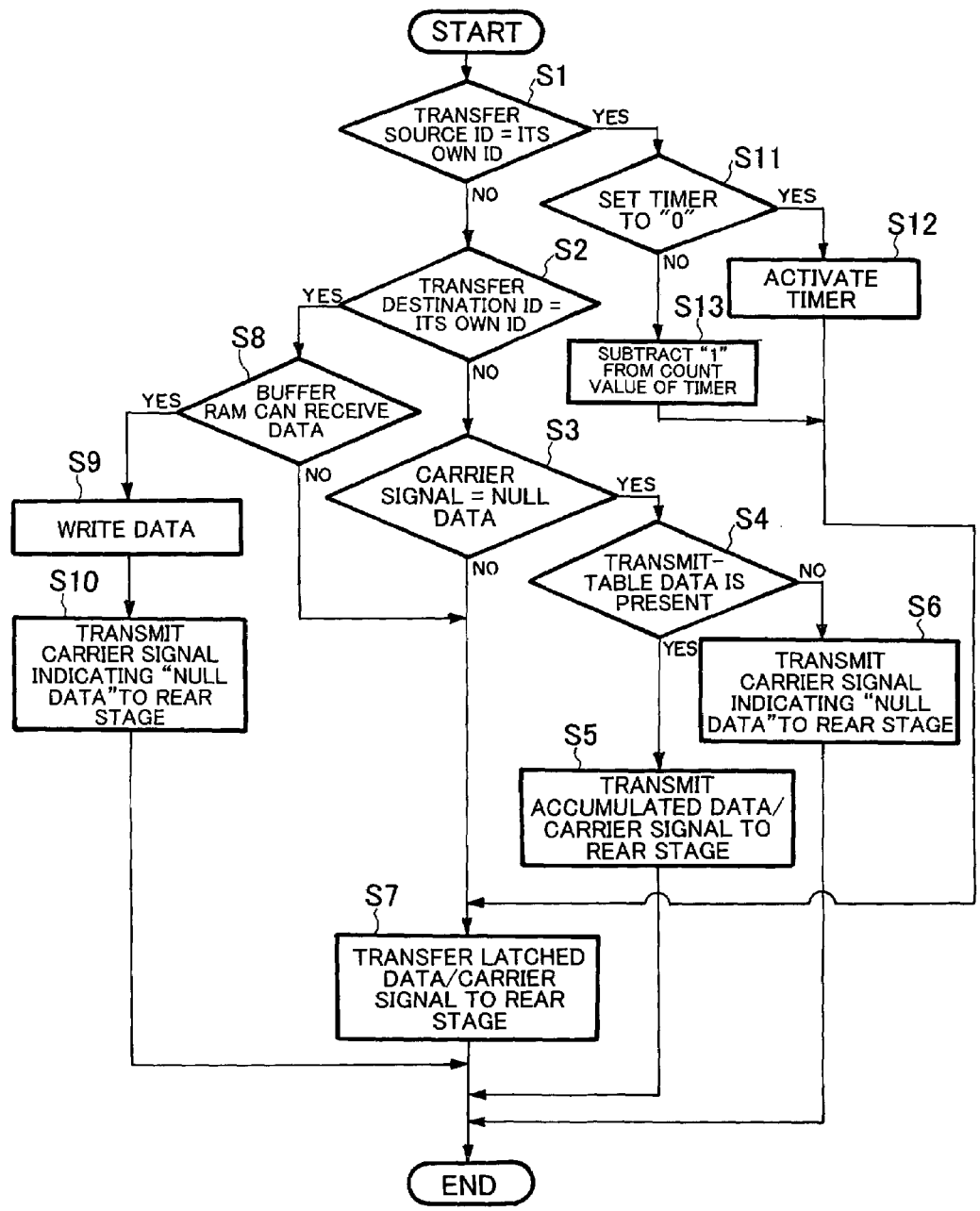
FIG. 4 is a flowchart of operation procedures according to the embodiment of the present invention.

Operation procedures of the switch mechanism 10a shown in FIG. 3 will be described with reference to the flowchart of FIG. 4. The carrier analysis unit 2115 analyzes the setting content of the carrier signal supplied from the carrier latch unit 2112, and performs the following processing according to an analysis result. First, the carrier analysis unit 2115 determines whether the ID of the switch mechanism 10a is set to the carrier signal transfer source ID 202 (in a step S1). This is a step of determining whether the packet data output with its own mechanism set as the transfer source is returned to the switch mechanism 10a without being received by the switch mechanism set as the transfer destination.

If determining that the ID 202 is not the ID of the switch mechanism 10a ("No" in the step S1), the carrier analysis unit 2115 determines whether the carrier signal transfer destination ID 201 is the ID of the switch mechanism 10a. If determining that the ID 201 is not the ID of the switch mechanism 10a ("No" in the step S2), the carrier analysis unit 2115 further determines the data position 203 of the carrier signal. If determining that the data position 203 indicates "NULL data", i.e., "00" is set to the data position 203 ("Yes" in the step S3), the carrier analysis unit 2115 confirms whether packet data that can be output to the following stage is present in the buffer FIFO 1111 of the input and output terminal 11.

If the packet data that can be output to the following stage is present in the buffer FIFO 1111 ("Yes" in the step S4), the carrier analysis unit 2115 indicates the data selector 2113 to select the packet data accumulated in the buffer FIFO 1111 and indicates the carrier selector 2114 to select the carrier signal generated by the carrier generation unit 1113. By doing so, the packet data and the carrier signal are transmitted to a gate 22 of the switch mechanism 10b in the following stage of the switch mechanism 10a with the switch mechanism 10a set as the transfer source (in a step S5).

If the packet data that can be output to the following stage is not present in the buffer FIFO 1111 ("No" in the step S4), the carrier analysis unit 2115 indicates the carrier selector 2114 to select the carrier signal latched by the carrier latch unit 2112, i.e., the carrier signal having "00" set to the data position 203. By doing so, the carrier signal indicating "NULL data" is transferred to the gate 22 of the following stage (in a step S6).

On the other hand, if the carrier signal transfer destination ID 201 is not the ID of the switch mechanism 10a and the carrier signal does not indicate "NULL" data ("No" in the step S3), the carrier analysis unit 2115 indicates the data selector 2113 and the carrier selector 2114 to select the packet data latched by the data latch unit 2111 and the carrier signal latched by the carrier latch unit 2112, respectively. By doing so, the packet data and the carrier signal latched by the switch mechanism 10a are transferred to the switch mechanism 10b in the following stage of the mechanism 10a as they are (in a step S7).

If determining that the ID of the switch mechanism 10a is set to the transfer ID 201 as a result of the carrier signal analysis ("Yes" in the step S2), then the carrier analysis unit 2115 determines that the packet data to be output to the network apparatus 30a is transferred from the input and output terminal 11, and confirms whether the buffer RAM 1121 of the input and output terminal 11 can receive data (in a step S8). If the buffer RAM 1121 cannot receive data since the buffer RAM 1121 is filled with data ("No" in the step S8), the carrier analysis unit 2115 transmits the latched packet data and carrier signal to the following stage as they are (in the step S7). The packet data transferred to the following stage this time tries to be output to the network apparatus 30a by the same procedures as those stated above when the packet data is returned again to the switch mechanism 10a along the loop 101A.

Further, if confirming that the buffer RAM 1121 can receive data ("Yes" in the step S8), the carrier analysis unit 2115 indicates the buffer RAM 1121 to write the packet data latched by the data latch unit 2111 (in a step S9), and supplies the carrier signal latched by the carrier latch unit 2112 to the protocol generation unit 1122. At this moment, the output unit 112 acquires the data position 203 of the carrier signal from the protocol generation unit 1122, and following ranges the packet data accumulated in the buffer RAM 1121 in an appropriate order using the sorting means 1123 based on the data position 203. The output unit 112 outputs the packet to the network apparatus 30a. Further, the carrier analysis unit 2115 indicates the carrier selector 2114 to select the carrier signal having "00" set to the data position 203. As a result, the carrier signal indicating "NULL data" is transmitted to the switch mechanism 10b in the following stage of the switch mechanism 10a (in a step S10).

If the carrier analysis unit 2115 determines that the ID of the switch mechanism 10a is set to the transfer ID 202 as the result of the carrier signal analysis ("Yes" in the step S1), that is, if the packet data output to the loop 101A with the switch mechanism 10a set as the transfer source is returned to the switch mechanism 10a without being received by the switch mechanism serving as the transfer destination, the carrier analysis unit 2115 checks a count value of the timer 21151. If the count value of the timer 21151 is "0" ("Yes" in a step S11), the carrier analysis unit 2115 activates the timer 21151 and sets a predetermined value to the timer 21151 (in a step S12). If the count value of the timer 21151 is not "0" ("No" in the step S11), the carrier analysis unit 2115 subtracts "1" from the present count value (in a step S13).

The carrier analysis unit 2115 suppresses data from being output from the input unit 111 to the gate 21 before the count value of the timer 21151 becomes "0" by countdown. The carrier analysis unit 2115 thereby stops newly transmitting packet data with the switch mechanism 10a set as the transfer source. It is thereby possible to avoid further transmitting the packet data to the switch mechanism, which is set as the transfer destination and which cannot receive packet data at this moment.

If finishing the processing on the timer 21151, the carrier analysis unit 2115 indicates the data selector 2113 and the carrier selector 2114 to select the latched packet data and carrier signal, respectively, so as to transfer the latched packet data and carrier signal to the following stage of the switch mechanism 10a as they are (in the step S7).

According to the switch system 101 in this embodiment stated so far, each switch mechanism regularly notifies the switch mechanism in the following stage thereof whether or not the packet data which this following switch mechanism is to receive is present using the carrier signal. Therefore, the switch mechanism in the following stage that receives the notification can appropriately determine whether packet data can be transmitted from its own mechanism. This makes it unnecessary to perform an arbitration operation in the loop in advance, thereby making it possible to reduce packet data transfer time. In addition, since all the switch mechanisms notify the switch mechanisms in the following stage thereof by the carrier signals, it is possible to transfer data in a maximum of a transfer band, which is a multiple of a transfer band among the respective gates by the number of gates to the maximum.

Moreover, if an ordinary communication protocol is used, it is necessary for the transfer destination to request retransmission if data does not reach the transfer destination. According to this embodiment, the packet data that is once output from the transfer source remains in the loop until the transfer destination receives the packet data. Therefore, it is unnecessary to perform the conventional retransmission processing.

Figure 5:
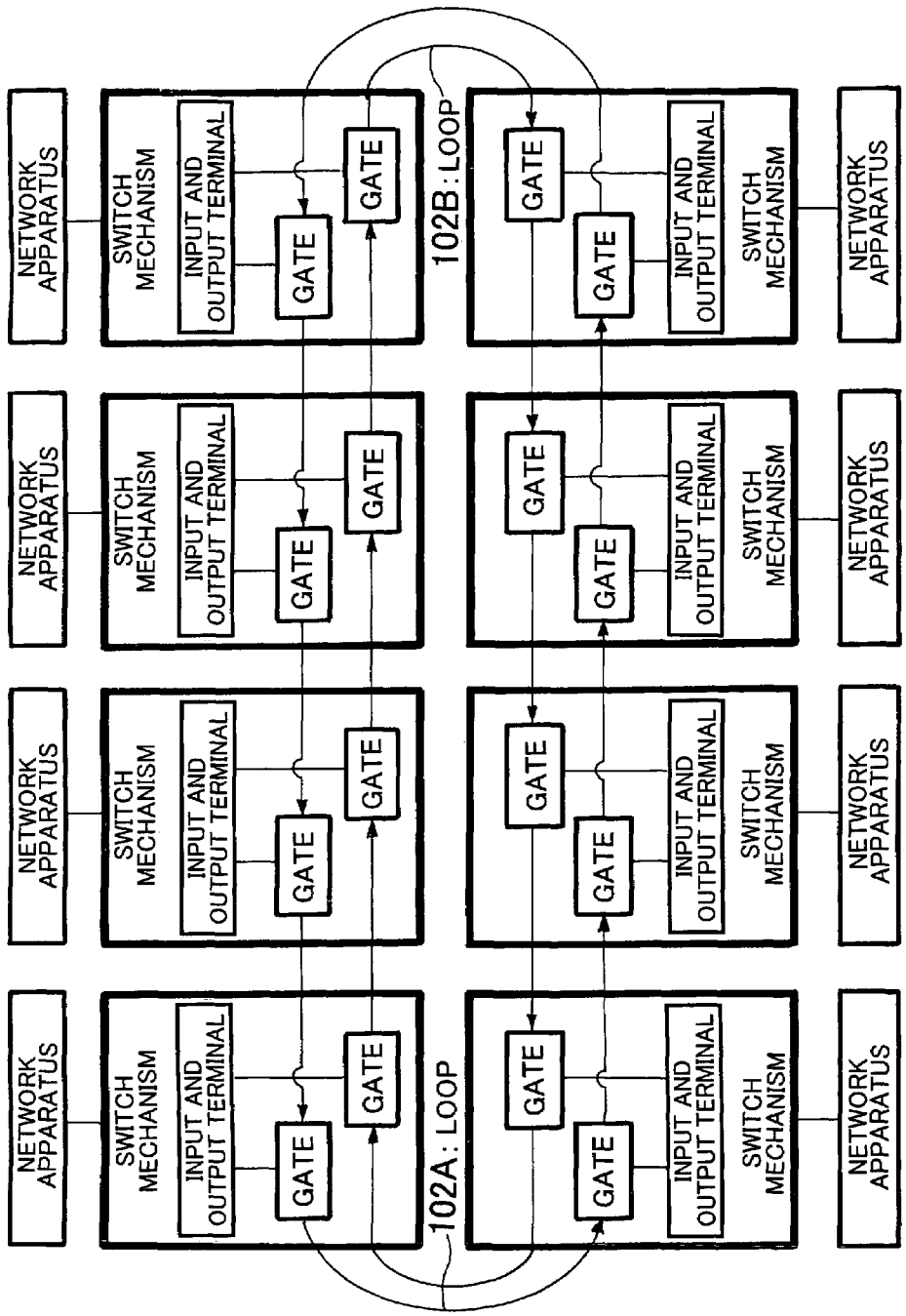
FIG. 5 is a block diagram of a configuration of a switch system according to another embodiment of the present invention.

In the configuration of the switch system according to the embodiment as shown in FIG. 1, the unidirectional loop 101A is formed. Alternatively, a bidirectional loop may be formed by providing an additional gate in each switch mechanism. FIG. 5 is a block diagram of a switch system according to another embodiment of the present invention. The switch system 102 shown in FIG. 5 is configured to include two gates relative to one input and output terminal. It is assumed that each input and output terminal can output data to any one of the two gates as long as the same data is not doubly output. It is also assumed that any one of the two gates can receive data. The received data is following ranged by the sorting means of the output unit. According to the switch system 102 shown in FIG. 5, because of double gates, a transfer band is doubled and it is possible to efficiently transfer a larger amount of data.

According to the present invention, each switch mechanism regularly notifies a switch mechanism in the following stage of the switch mechanism whether or not a packet to be received by the following stage in the loop is present by the transmission information. Therefore, the following switch mechanism thus notified of the information can appropriately determine whether a packet can be transmitted to the loop from the mechanism. This makes it unnecessary to perform an arbitration operation in the loop in advance, thereby making it possible to reduce a packet transfer time in the loop.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:

1. A switch system comprising a plurality of switch mechanisms that form a ring topology,
   wherein each of the switch mechanisms includes:
   an input and output unit that inputs and outputs a packet to and from an outside of a loop; and
   a gate unit that transmits transmission information, including information on whether there is a packet to be received by one of the switch mechanisms set as a following stage in the loop, to the following stage in the loop at predetermined time intervals,
   wherein the input and output unit accumulates the packet input from the outside of the loop, and generates transmission information on the accumulated packet, and
   wherein the gate unit transmits the packet accumulated in the input and output unit and the transmission information on the accumulated packet to a following stage in the loop when receiving transmission information, from one of the switch mechanisms set at a preceding stage in the loop, including information on whether there is not a packet to be received.

2. The switch system according to claim 1, wherein
   the gate unit determines whether the input and output unit can receive a packet when receiving the transmission information, from the preceding stage in the loop, indicating that there is a packet to receive and a destination of the packet is the switch mechanism itself, and the gate unit supplies a packet receiving from the preceding stage in the loop to the input and output unit and transmits the transmission information indicating that there is not a packet to be received by the following stage to the following stage in the loop if determining that the input and output unit can receive the packet.

3. The switch system according to claim 2, wherein
   the gate unit transfers the received transmission information and the packet to the following stage in the loop if determining that the input and output unit cannot receive the packet.

4. The switch system according to claim 1, wherein
   when receiving transmission information, from the preceding stage in the loop, indicating that there is a packet to receive and that a transmission source of the packet is the switch mechanism itself, the gate unit transfers the transmission information and a packet receiving from the preceding stage in the loop to the following stage in the loop and stops transmitting the packet accumulated in the input and output unit to the following stage in the loop for a predetermined period.

5. The switch system according to claim 1, wherein
   the gate unit transmits the packet accumulated in the input and output unit while dividing the packet into packet parts each having a predetermined data amount, and
   the input and output unit sets information indicating a relative position of each of the divided packet part to the transmission information on the each divided packet part to be transmitted.

6. The switch system according to claim 1, wherein
   the input and output unit performs a conversion between a communication protocol used in the outside of the loop and a communication protocol used in the loop for the packet to be input and output to and from the outside of the loop.

7. The switch system according to claim 1, wherein
   the each switch mechanism includes a pair of gate mechanisms which perform to make a preceding stage and a following stage in the loop reverse their stages.

8. A loop transfer method comprising steps of:
   forming a plurality of switch mechanisms into a ring topology to transmit transmission information including whether there is a packet to be received by one of the switch mechanisms set as a following stage in the loop to the following stage in the loop at predetermined time's intervals,
   accumulating by each switch mechanism the packet and generating transmission information on the packet when the packet is input from the outside of the loop; and
   transmitting by each switch mechanism the accumulated packet and the transmission information on the accumulated packet to a following stage in the loop when each switch mechanism receives transmission information, from one of the switch mechanisms set at preceding stage in the loop, including information on whether there is not a packet to be received.

9. The loop transfer method according to claim 8, further comprising a steps of:
   determining by each switch mechanism whether the each switch mechanism can receive a packet when receiving the transmission information, from the preceding stage in the loop, indicating that there is a packet to receive and a destination of the packet is the switch mechanism itself, and
   receiving by each switch mechanism a packet from the preceding stage in the loop and transmitting the transmission information indicating that there is not a packet to be received by the following stage to the following stage in the loop if the switch mechanism determines that it can receive a packet.

10. The loop transfer method according to claim 9, wherein each switch mechanism transfers the received transmission information and the packet to the following stage in the loop if it is determined that the each switch mechanism cannot receive the packet.

11. The loop transfer method according to claim 8, further comprising a step of:

transferring by each switch mechanism transmission information and the packet to the following stage in the loop and stops transmitting the accumulated packet to the following stage in the loop for a predetermined period when the switch mechanism receives the transmission information, from the a preceding stage in the loop, including information on whether there is a packet to be received and that a transmission source of the packet is the switch mechanism itself.

12. The loop transfer method according to claim 8, wherein in the step of transmitting by each switch mechanism the accumulated packet to the following stage in the loop, the switch mechanism transmits the packet while dividing the packet into packet parts each having a predetermined data amount, and, before transmission, the switch mechanism sets information indicating a relative position of each of the divided packet part to the transmission information on the divided packet part to be transmitted.

13. The loop transfer method according to claim 8, wherein each switch mechanism performs a conversion between a communication protocol used in the outside of the loop and a communication protocol used in the loop for the packet to be input and output to and from the outside of the loop.

* * * * *